United States Patent
Xu et al.

(10) Patent No.: US 10,378,658 B2
(45) Date of Patent: Aug. 13, 2019

(54) STOP VALVE AND AIR CONDITIONER HAVING THE SAME

(71) Applicants: GD MIDEA HEATING & VENTILATING EQUIPMENT CO., LTD., Foshan (CN); MIDEA GROUP CO., LTD., Foshan (CN)

(72) Inventors: Yongfeng Xu, Foshan (CN); Langshui Huang, Foshan (CN); Tiegang Zhang, Foshan (CN); Weihong Luo, Foshan (CN); Shengsheng Liao, Foshan (CN)

(73) Assignee: GD MIDEA HEATING & VENTILATING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 15/538,810

(22) PCT Filed: Aug. 18, 2015

(86) PCT No.: PCT/CN2015/087323
§ 371 (c)(1),
(2) Date: Jun. 22, 2017

(87) PCT Pub. No.: WO2016/155201
PCT Pub. Date: Oct. 6, 2016

(65) Prior Publication Data
US 2018/0023709 A1    Jan. 25, 2018

(30) Foreign Application Priority Data

Apr. 3, 2015    (CN) .......................... 2015 1 0158170
Apr. 3, 2015    (CN) ..................... 2015 2 0202230 U

(51) Int. Cl.
F16K 1/46    (2006.01)
F16K 1/04    (2006.01)
F25B 41/04    (2006.01)

(52) U.S. Cl.
CPC .................. *F16K 1/46* (2013.01); *F16K 1/04* (2013.01); *F25B 41/04* (2013.01)

(58) Field of Classification Search
CPC ... F25B 41/04; F16K 1/46; F16K 1/04; F16K 1/385; F16K 5/0407
(Continued)

(56) References Cited

U.S. PATENT DOCUMENTS 2,657,897 A * 11/1953 Folmsbee ................. F16K 1/46
                                                                251/333
2,784,933 A *  3/1957 Newell ..................... F16K 1/04
                                                                 169/37

(Continued)

FOREIGN PATENT DOCUMENTS

CN    2179937 Y    10/1994
CN    2315389 Y    4/1999
(Continued)

OTHER PUBLICATIONS

Translation of JP2005308101.*
(Continued)

*Primary Examiner* — Kevin F Murphy
*Assistant Examiner* — Kelsey E Cary
(74) *Attorney, Agent, or Firm* — Kilpatrick Townsend & Stockton, LLP

(57) ABSTRACT

Provided are a stop valve (100) and an air conditioner having the same. The stop valve (100) includes: a valve seat (1) defining a valve chamber (11) and a fitting chamber (12) in communication with the valve chamber (11), in which the fitting chamber (12) is located at a first end face of the valve chamber (11) and the valve chamber (11) is provided with two ports (112) in communication with the valve chamber (11); a lantern ring (2) fitted in one of the two ports (112); a valve disc (3) including a fitting part (31) and a stopping
(Continued)

part (32) disposed to the fitting part (31), in which the fitting part (31) is threadedly fitted with the fitting chamber (12), the stopping part (32) is located in the valve chamber (11); and an elastic sealing member (4).

14 Claims, 2 Drawing Sheets

(58) Field of Classification Search
USPC .................. 251/318, 264, 265, 333, 357
See application file for complete search history.

(56) References Cited

U.S. PATENT DOCUMENTS

| | | | |
|---|---|---|---|
| 3,382,894 A | | 5/1968 | Shurtleff et al. |
| 4,188,013 A | * | 2/1980 | Battersby ............... F23N 5/107 251/175 |
| 4,264,053 A | * | 4/1981 | Carlson .................. F16K 27/07 251/144 |
| 5,067,521 A | | 11/1991 | Jenks et al. |
| 8,820,707 B2 | * | 9/2014 | Chang ................ F16K 37/0008 251/216 |
| 2015/0041697 A1 | * | 2/2015 | Hermann ................ F16K 1/38 251/264 |

FOREIGN PATENT DOCUMENTS

| | | | | |
|---|---|---|---|---|
| CN | 2408310 Y | | 11/2000 | |
| CN | 1432776 A | | 7/2003 | |
| CN | 101365901 A | | 2/2009 | |
| CN | 202674326 U | | 1/2013 | |
| CN | 202812247 U | | 3/2013 | |
| CN | 203477368 U | | 3/2014 | |
| CN | 203926854 U | | 11/2014 | |
| CN | 104776235 A | | 7/2015 | |
| CN | 204533578 U | | 8/2015 | |
| FR | 2410773 A1 | | 6/1979 | |
| GB | 1446705 A | * | 8/1976 | ............... F16K 1/46 |
| JP | 2000310460 A | | 11/2000 | |
| JP | 2005308101 A | | 11/2005 | |
| JP | 2010164149 A | | 7/2010 | |
| WO | WO 2005052471 A1 | | 6/2005 | |

OTHER PUBLICATIONS

Chinese Patent Application No. 201510158170.7 First Office Action dated Aug. 31, 2016 7 pages.
Chinese Patent Application No. 201510158170.7 English translation of First Office Action dated Aug. 31, 2016 7 pages.
PCT/CN2017/0903387 International Search Report and Written Opinion dated Dec. 30, 2015, 12 pages.
PCT/CN2017/0903387 English translation of International Search Report dated Dec. 30, 2015, 12 pages,3 pages.
PCT/CN2017/0903387 English translation of Written Opinion dated Dec. 30, 2015, 12 pages.
European Patent Application No. 15887161.6 extended Search and Opinion dated Jul. 19, 2018, 7 pages.

* cited by examiner

STOP VALVE AND AIR CONDITIONER HAVING THE SAME

RELATED APPLICATIONS

This U.S. application is a U.S. National Phase application of the International Patent Application No. PCT/CN2015/087323, filed Aug. 18, 2015, which claims the benefit of prior Chinese Applications No. 201510158170.7 filed Apr. 3, 2015 and No. 201520202230.6 filed Apr. 3, 2015. The entire contents of the before-mentioned patent applications are incorporated by reference as part of the disclosure of this U.S. application.

FIELD

The present invention relates to a manufacturing field of mechanical devices, and more particularly to a stop valve and an air conditioner having the same.

BACKGROUND

Usually, a valve disc and a lantern ring of a stop valve are both made of metal materials. When the stop valve is in a cut-off state, a large fastening torque is needed to provide a good sealing performance to a sealing surface between the valve disc and the lantern ring, but the large fastening torque tends to cause abrasion to the sealing surface between the valve disc and the lantern ring, thus resulting in a leakage inside the stop valve.

SUMMARY

The present invention aims to solve at least one of the problems existing in the related art. Thus, embodiments of the present invention provide a stop valve that may reduce a fastening torque to some extent and avoid an abrasion of a sealing surface between a lantern ring and a valve disc, so as to avoid a leakage inside the stop valve.

Embodiments of the present invention further provide an air conditioner having the above stop valve.

The stop valve according to embodiments of the present invention includes: a valve seat defining a valve chamber and a fitting chamber in communication with the valve chamber, in which the fitting chamber is located at a first end face of the valve chamber and the valve chamber is provided with two ports in communication with the valve chamber; a lantern ring fitted in one of the two ports; a valve disc including a fitting part and a stopping part disposed to the fitting part, in which the fitting part is threadedly fitted with the fitting chamber, the stopping part is located in the valve chamber and threadedly fitted with the valve chamber, and the stopping part is configured to touch the first end face or the lantern ring to communicate or block the two ports; and an elastic sealing member disposed at an end face of the stopping part facing the lantern ring and configured to touch an end face of the lantern ring to block a communication of the two ports.

For the stop valve according to embodiments of the present invention, by providing the elastic sealing member at the end face of the stopping part of the valve disc facing the lantern ring, a torque required to fasten the valve disc with the lantern ring may be reduced to some extent, and an abrasion of a sealing surface between the lantern ring and the valve disc may be avoided, thus preventing a leakage inside the stop valve, prolonging a service life of the stop valve, and reducing a maintenance rate.

According to some embodiments of the present invention, the stop valve further includes a fastening washer and a fixing member, and the fixing member passes through the fastening washer and the elastic sealing member successively to be fixed to the valve disc.

Further, the elastic sealing member is provided with a groove for receiving the fastening washer, and an end face of the elastic sealing member facing the lantern ring is flush with an end face of the fastening washer.

Further, a free end of the fixing member is flush with the fastening washer.

According to some embodiments of the present invention, the stopping part is provided with a receiving groove, a central part of the elastic sealing member is received in the receiving groove, and a rest part thereof is located on the end face of the stopping part for touching the lantern ring.

According to some embodiments of the present invention, the stop valve further includes an annular sealing gasket embedded in an outer peripheral wall of the fitting part.

According to some embodiments of the present invention, the elastic sealing member is fitted with the end face of the lantern ring in a non-inclined plane.

According to some embodiments of the present invention, the elastic sealing member is fitted with the end face of the lantern ring in an inclined plane.

According to some embodiments of the present invention, the elastic sealing member is a rubber member or a plastic member.

The air conditioner according to embodiments of the present invention includes the above stop valve.

For the air conditioner according to embodiments of the present invention, by applying the above stop valve to the air conditioner, the leakage inside the stop valve may be avoided to some extent, thus extending the service life of the stop valve and hence the service life of the air conditioner.

Figure 1:
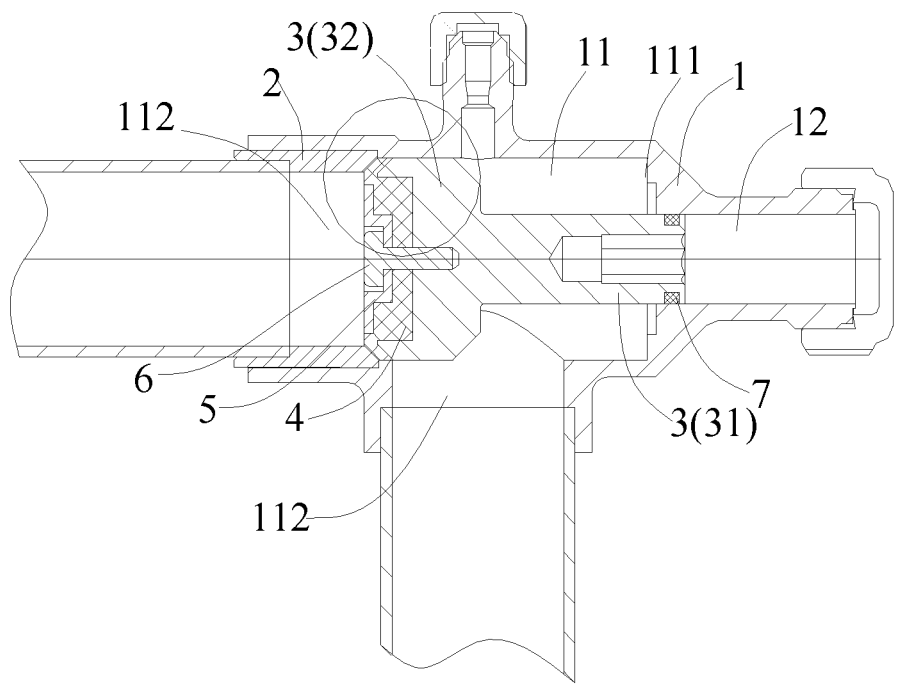
FIG. 1 is a schematic view of a stop valve according to an embodiment of the present invention.

REFERENCE NUMERALS stop valve 100;
valve seat 1, valve chamber 11, first end face 111, port 112, fitting chamber 12;
lantern ring 2;
valve disc 3, fitting part 31, stopping part 32;
elastic sealing member 4;
fastening washer 5;
fixing member 6;
sealing gasket 7.

DETAILED DESCRIPTION

Embodiments of the present invention will be described in detail and examples of the embodiments will be illustrated in the drawings. The embodiments described herein with reference to drawings are explanatory, which are used to illustrate the present invention, but shall not be construed to limit the present invention.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the following, a stop valve 100 according to embodiments of the present invention will be described with reference to FIGS. 1 to 4. The stop valve 100 may be applied in pipelines to conduct, partially conduct or block media circulating in the pipelines. For example, the stop valve 100 according to embodiments of the present invention may be applied in pipelines of an air conditioner.

As shown in FIGS. 1 to 4, the stop valve 100 according to embodiments of the present invention may include a valve seat 1, a lantern ring 2, a valve disc 3 and an elastic sealing member 4.

Specifically, the valve seat 1 defines a valve chamber 11 and a fitting chamber 12 in communication with the valve chamber 11, and the fitting chamber 12 is located at a first end face 111 of the valve chamber 11, that is, the first end face 111 of the valve chamber 11 is connected with the fitting chamber 12 in communication with the valve chamber 11. The valve chamber 11 is further provided with two ports 112 in communication with the valve chamber 11, and the two ports 112 may be in communication with two pipelines respectively, so as to connect the stop valve 100 in pipelines of the air conditioner.

The lantern ring 2 is fitted in one of the two ports 112, that is, the lantern ring 2 may be provided to an inside wall of the valve chamber 11 and fitted in the one of the two ports 112.

The valve disc 3 includes a fitting part 31 and a stopping part 32 disposed to the fitting part 31. The fitting part 31 is threadedly fitted with the fitting chamber 12, and the stopping part 32 is located in the valve chamber 11 and threadedly fitted with the valve chamber 11. The stopping part 32 is configured to touch the first end face 111 or the lantern ring 2 to communicate or block the two ports 112. Specifically, a thread fit between the fitting part 31 and the fitting chamber 12 and another thread fit between the stopping part 32 and the valve chamber 11 may allow the stopping part 32 to move back and forth in the valve chamber 11. When the stopping part 32 moves to touch the lantern ring 2, a communication between the two ports 112 is blocked, in which case the stop valve 100 is in a cut-off state. When the stopping part 32 moves to touch the first end face 111, the port 112 where the lantern ring 2 is provided is conducted, i.e. the two ports 112 are communicated with each other, in which case the stop valve 100 is in a conducting state. When the stopping part 32 moves to any position between the lantern ring 2 and the first end face 111, a partial conduction function of the stop valve 100 can be realized to play a throttling effect.

In specific examples of FIGS. 1 to 4, the valve disc 3 may move left and right to communicate the two ports 112 or block the communication of the two ports 112. For the convenience of description, a left and right movement of the valve disc 3 is taken as an example for illustration, in following descriptions. However, it should be understood that a moving direction of the valve disc 3 herein is only explanatory, and shall not be construed to limit the valve disc 3.

Figure 3:
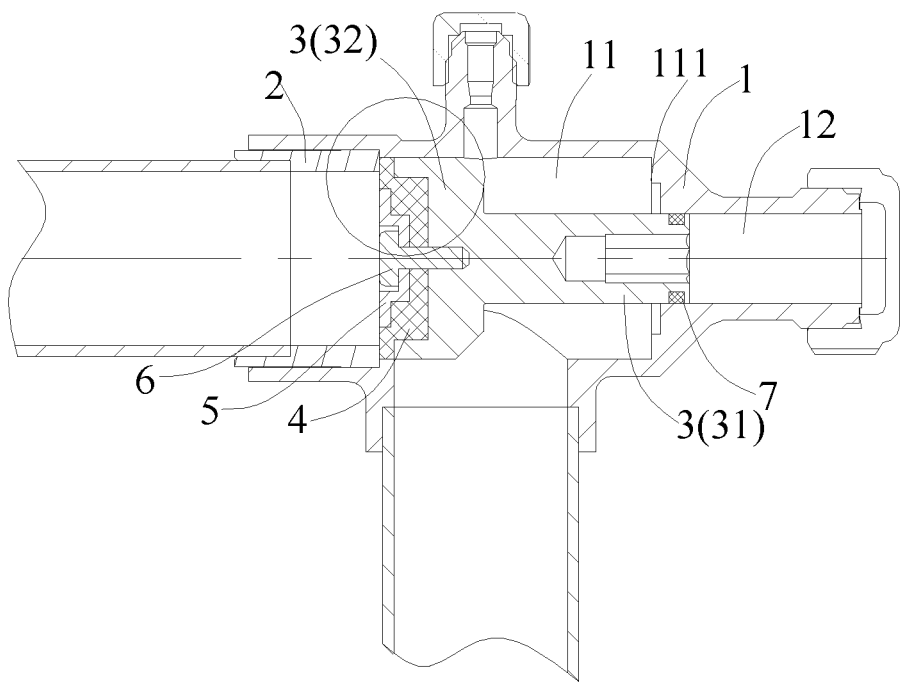
FIG. 3 is a schematic view of a stop valve according to another embodiment of the present invention.

The elastic sealing member 4 is disposed at an end face of the stopping part 32 facing the lantern ring 2, and optionally, the elastic sealing member 4 is a rubber member or a plastic member. The elastic sealing member 4 is configured to touch an end face of the lantern ring 2 to block the communication of the two ports 112. That is, when the valve disc 3 moves towards the lantern ring 2 (e.g. moving leftwards as shown in FIGS. 1 and 3), the elastic sealing member 4 disposed at the end face of the stopping part 32 facing the lantern ring 2 may touch the end face of the lantern ring 2 to form a sealing surface therebetween, such that not only the stop valve 100 may block the communication of the two ports 112, but also a high-temperature deformation of the lantern ring 2, which is caused when the lantern ring 2 is welded into the port 112, may be compensated thanks to a certain elasticity of the elastic sealing member 4, and hence a small torque may satisfy the sealing between the elastic sealing member 4 and the lantern ring 2 to fasten the valve disc 3.

For the stop valve 100 according to embodiments of the present invention, by providing the elastic sealing member 4 at the end face of the stopping part 32 of the valve disc 3 facing the lantern ring 2, the torque required to fasten the valve disc 3 with the lantern ring 2 may be reduced to some extent, and an abrasion of the sealing surface between the lantern ring 2 and the valve disc 3 may be avoided, thus preventing a leakage inside the stop valve 100, prolonging a service life of the stop valve 100 and reducing a maintenance rate.

In some embodiments of the present invention, the stop valve 100 may further include a fastening washer 5 and a fixing member 6. The fixing member 6 passes through the fastening washer 5 and the elastic sealing member 4 successively to be fixed to the valve disc 3, in which way the elastic sealing member 4 is thus fixed to the valve disc 3 and prevented from falling off. For example, the elastic sealing member 4 fixed by the fastening washer 5 and the fixing member 6 moves leftwards as the valve disc 3 moves leftwards, and hence touches the end face of the lantern ring 2 to block the communication of the two ports 112, so as to avoid sealing failures caused by displacement, deviation or looseness of the elastic sealing member 4.

Further, the elastic sealing member 4 is provided with a groove for receiving the fastening washer 5, and an end face of the elastic sealing member 4 facing the lantern ring 2 is flush with an end face of the fastening washer 5, that is, the groove is provided at a side of the elastic sealing member 4 facing the lantern ring 2. When the fastening washer 5 is placed in the groove, the end face of the fastening washer 5 is flush with the end face of the elastic sealing member 4 facing the lantern ring 2.

Certainly, it may be understood by those skilled in that related art that the end face of the elastic sealing member 4 facing the lantern ring 2 may not be flush with the end face of the fastening washer 5. For example, the end face of the elastic sealing member 4 is higher than the end face of the fastening washer 5.

Further, a free end of the fixing member 6 is flush with the fastening washer 5, such that the free end of the fixing member 6, the end face of the fastening washer 5 and the end face of the elastic sealing member 4 are flush with one another. As shown in FIGS. 1 to 4, a mounting groove may be provided at a side of the fastening washer 5 facing the lantern ring 2, a fixed end of the fixing member 6 goes through the mounting groove, and then passes through the fastening washer 5 and the elastic sealing member 4 successively to be fixed to the valve disc 3, while the free end of the fixing member 6 is received in the mounting groove. Furthermore, the free end of the fixing member 6 is flush with the end face of the fastening washer 5. Thus, the fastening washer 5 and the elastic sealing member 4 are fixed to the valve disc 3.

Certainly, the present invention is not limited to this, and the free end of the fixing member 6 may not be flush with the end face of the fastening washer 5. For example, the free end of the fixing member 6 may protrude beyond the end face of the fastening washer 5.

In some embodiments of the present invention, the stopping part 32 is provided with a receiving groove, a central part of the elastic sealing member 4 is received in the receiving groove, and a rest part thereof is located on the end face of the stopping part 32 for touching the lantern ring 2. Thus, on one hand, the central part of the elastic sealing member 4 is received in the receiving groove to fix the elastic sealing member 4 to the stopping part 32 and to prevent the elastic sealing member 4 from falling off; on the other hand, the rest part of the elastic sealing member 4 is configured to touch the lantern ring 2 to form the sealing surface, so as to reduce the torque necessary for fastening the valve disc 3 with the lantern ring 2 and to avoid the abrasion of the sealing surface between the lantern ring 2 and the valve disc 3 and also the leakage inside the stop valve 100.

In some embodiments of the present invention, the stop valve 100 further includes an annular sealing gasket 7, and the sealing gasket 7 is embedded in an outer peripheral wall of the fitting part 31, such that the sealing gasket 7 may further seal a gap between the fitting part 31 and the fitting chamber 12.

When the stopping part 32 of the valve disc 3 moves rightwards till touches the first end face 111, a contact seal is formed between the stopping part 32 and the first end face 111, a fitting seal is formed between the sealing gasket 7 and the fitting chamber 12, and a thread seal is formed between the fitting part 31 and the fitting chamber 12. That is, three sealing structures are provided when the stop valve 100 is in the conducting state, so as to improve an anti-leakage ability of the stop valve 100 and greatly extend the service life thereof.

Figure 2:
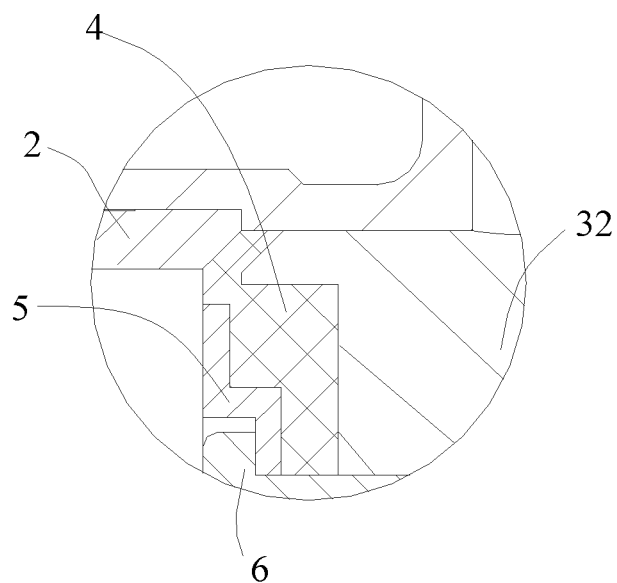
FIG. 2 is an enlarged view of a part circled in FIG. 1.
Figure 4:
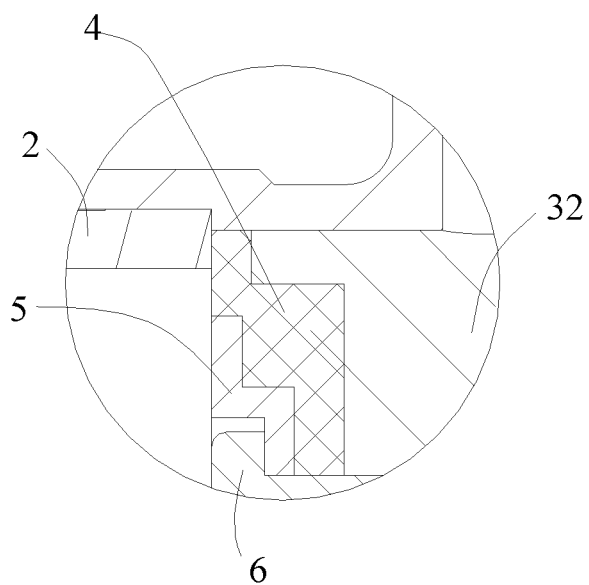
FIG. 4 is an enlarged view of a part circled in FIG. 3.

In some embodiments of the present invention, as shown in FIGS. 1 and 2, the elastic sealing member 4 is fitted with the end face of the lantern ring 2 in an inclined plane. Certainly, the present invention is not limited to this, and the elastic sealing member 4 may also be fitted with the end face of the lantern ring 2 in a non-inclined plane, as shown in FIGS. 3 and 4.

An air conditioner according to embodiments of the present invention includes the stop valve 100 described above.

For the air conditioner according to embodiments of the present invention, by applying the above stop valve 100 to the air conditioner, the leakage inside the stop valve 100 may be avoided to some extent, thus extending the service life of the stop valve 100 and hence the service life of the air conditioner.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "specific examples" or "some examples" means that a particular feature, structure, material, or characteristic described in connection with the embodiment or example is included in at least one embodiment or example of the present invention. Thus, the appearances of the above phrases throughout this specification are not necessarily referring to the same embodiment or example of the present invention. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present invention have been shown and illustrated, it shall be understood by those skilled in the art that various changes, modifications, alternatives and variants without departing from the principle and spirit of the present invention are acceptable. The scope of the present invention is defined by the claims or the like.

What is claimed is:

1. A stop valve, comprising:
   a valve seat defining a valve chamber and a fitting chamber in communication with the valve chamber, wherein the fitting chamber is located at a first end face of the valve chamber and the valve chamber is provided with two ports in communication with the valve chamber;
   a lantern ring fitted in one of the two ports and engaged with an inner wall of the one of the two ports;
   a valve disc comprising a fitting part and a stopping part disposed to the fitting part, wherein the fitting part is threadedly fitted with the fitting chamber, a thread fit between the fitting part and the fitting chamber allowing the fitting part to move back and forth in the fitting chamber, the stopping part being located in the valve chamber and threadedly fitted with an inner wall of the valve chamber, a thread fit between the stopping part and the valve chamber allowing the stopping part to move back and forth in the valve chamber, and the stopping part being configured to touch the first end face or the lantern ring to communicate or block the two ports;
   an elastic sealing member disposed at an end face of an outer periphery of the stopping part facing the lantern ring and configured to touch an end face of the lantern ring to block a communication of the two ports; and a fastening washer and a fixing member, wherein the fixing member passes through the fastening washer and the elastic sealing member successively to be fixed to the valve disc; and, wherein the elastic sealing member is provided with a groove for receiving the fastening washer, and an end face of the elastic sealing member facing the lantern ring is flush with an end face of the fastening washer.

2. The stop valve according to claim 1, wherein a free end of the fixing member is flush with the fastening washer.

3. The stop valve according to claim 1, wherein the stopping part is provided with a receiving groove, the elastic sealing member comprises a central part and a peripheral part surrounding the central part, the peripheral part is disposed at the end face of the outer periphery of the stopping part facing the lantern ring for touching the end face of the lantern ring, and the central part is received in the receiving groove.

4. The stop valve according to claim 1, further comprising an annular sealing gasket embedded in an outer peripheral wall of the fitting part.

5. The stop valve according to claim 1, wherein the elastic sealing member is fitted with the end face of the lantern ring in a non-inclined plane.

6. The stop valve according to claim 1, wherein the elastic sealing member is fitted with the end face of the lantern ring in an inclined plane.

7. The stop valve according to claim 1, wherein the elastic sealing member is a rubber member or a plastic member.

8. An air conditioner, comprising a stop valve, wherein the stop valve comprises:

a valve seat defining a valve chamber and a fitting chamber in communication with the valve chamber, wherein the fitting chamber is located at a first end face of the valve chamber and the valve chamber is provided with two ports in communication with the valve chamber;

a lantern ring fitted in one of the two ports and engaged with an inner wall of the one of the two ports;

a valve disc comprising a fitting part and a stopping part disposed to the fitting part, wherein the fitting part is threadedly fitted with the fitting chamber, the thread fit between the fitting part and the fitting chamber allowing the fitting part to move back and forth in the fitting chamber, the stopping part being located in the valve chamber and threadedly fitted with an inner wall of the valve chamber, a thread fit between the stopping part and the valve chamber allowing the stopping part to move back and forth in the valve chamber, and the stopping part being configured to touch the first end face or the lantern ring to communicate or block the two ports;

an elastic sealing member disposed at an end face of an outer periphery of the stopping part facing the lantern ring and configured to touch an end face of the lantern ring to block a communication of the two ports; and a fastening washer and a fixing member, wherein the fixing member passes through the fastening washer and the elastic sealing member successively to be fixed to the valve disc; and, wherein the elastic sealing member is provided with a groove for receiving the fastening washer, and an end face of the elastic sealing member facing the lantern ring is flush with an end face of the fastening washer.

9. The air conditioner according to claim 8, wherein a free end of the fixing member is flush with the fastening washer.

10. The air conditioner according to claim 8, wherein the stopping part is provided with a receiving groove, the elastic sealing member comprises a central part and a peripheral part surrounding the central part, the peripheral part is disposed at the end face of the outer periphery of the stopping part facing the lantern ring for touching the end face of the lantern ring, and the central part is received in the receiving groove.

11. The air conditioner according to claim 8, further comprising an annular sealing gasket embedded in an outer peripheral wall of the fitting part.

12. The air conditioner according to claim 8, wherein the elastic sealing member is fitted with the end face of the lantern ring in a non-inclined plane.

13. The air conditioner according to claim 8, wherein the elastic sealing member is fitted with the end face of the lantern ring in an inclined plane.

14. The air conditioner according to claim 8, wherein the elastic sealing member is a rubber member or a plastic member.

* * * * *